United States Patent Office 3,287,398
Patented Nov. 22, 1966

3,287,398
PARA SUBSTITUTED BENZYL-1-ISOPROPYLI-
DENE-CARBAZATES
André Allais and Pierre Girault, Paris, France, assignors
to Roussel-Uclaf, S.A., Paris, France, a corporation of
France
No Drawing. Filed Sept. 20, 1963, Ser. No. 310,487
Claims priority, application France, Oct. 1, 1962,
910,894; Dec. 28, 1962, 920,019, Patent M 2,467;
June 11, 1963, 937,718
5 Claims. (Cl. 260—482)

The invention relates to novel substituted benzyl-1-isopropyl carbazates having the formula

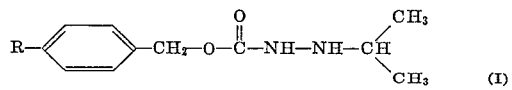

(I)

wherein R is selected from the group consisting of hydrogen, halogen and a lower alkoxy radical having 1 to 4 carbon atoms and their acid addition salts. The invention further relates to a novel process for the preparation of the said carbazates and to novel intermediates therefor. The invention also relates to novel compositions and a novel method of treating neuro-depressive states and anxiety psychoses.

The benzyl-1-isopropyl carbazates of Formula I possess interesting pharmacological properties and particularly possess an amino-oxidase inhibiting activity and may be used as psychotropes in conditions of depression. They are useful for the treatment of conditions of anxiety in general medicine, of depressant syndromes in psychiatry and as a curative or preventive agent in angina crises in cardiology.

It is an object of the invention to provide novel carbazates of Formula I and their acid addition salts.

It is another object of the invention to provide a novel process for the prepartion of the carbazates of Formula I.

It is a further object of the invention to provide novel intermediates for the preparation of the carbazates of Formula I.

It is an additional object of the invention to provide novel compositions for the treatment of neuro-depressive states and anxiety psychoses.

It is another object of the invention to provide a novel method of treating neuro-depressive states and anxiety psychoses.

These and other objects and advantages of the invention will become obvious from the following detailed description.

The novel compounds of the invention are selected from the group consisting of benzyl-1-isopropyl-carbazates having the formula

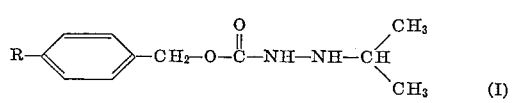

(I)

wherein R is selected from the group consisting of hydrogen, halogen and a lower alkoxy radical having 1 to 4 carbon atoms and their non-toxic, pharmacologically acceptable acid addition salts. Examples of particular suitable halogens are chlorine and fluorine.

Examples of suitable acids for the formation of the non-toxic, pharmacologically acceptable acid addition salts are mineral acids such as hydrochloric acid, sulfuric acid, etc. and organic acids such as acetic acid, citric acid, tartaric acid, picric acid, etc.

The process of the invention for the preparation of the benzyl-1-isopropyl-carbazates of Formula I comprises condensing a benzyl-carbazate having the formula

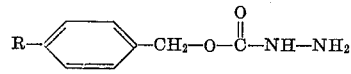

wherein R has the above definition with acetone to form the corresponding benzyl-1-isopropylidene-carbazate, reducing the latter to form the corresponding benzyl-1-isopropyl-carbazate and recovering the later or forming an acid addition salt of the latter by reaction with an organic acid or a mineral acid. The reaction scheme is illustrated in Table I.

TABLE I

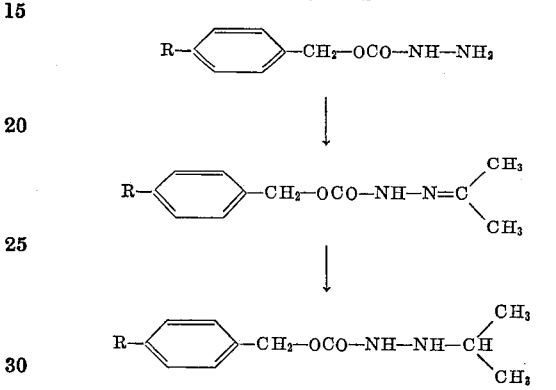

wherein R is selected from the group consisting of hydrogen, halogen and a lower alkoxy radical having 1 to 4 carbon atoms.

The condensation of the desired benzyl carbazate is preferably effected in the presence of a small quantity of acetic acid. The reduction of the isopropylidene carbazate may be effected with an alkali metal borohydride such as sodium or potassium borohydride or by catalytic hydrogenation in the presence of a platinum catalyst.

The compositions of the invention for the treatment of neuro-depressive states and anxiety psychoses are comprised of a carbazate selected from the group consisting of benzyl-1-isopropyl carbazates having the formula

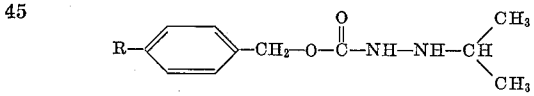

wherein R is selected from the group consisting of hydrogen, halogen and a lower alkoxy radical having 1 to 4 carbon atoms and non-toxic, pharmaceutically acceptable acid addition salts thereof and a major amount of a pharmacological carrier. The compositions may be in the form of injectable solutions or suspensions, in the form of ampules and multiple dose flacons, in the form of tablets, coated tablets and suppositories prepared in the usual manner.

The method of the invention for treatment of neuro-depressive states and anxiety psychoses comprises administering an effective amount of a carbazate selected from the group consisting of benzyl-1-isopropyl carbazates having the formula

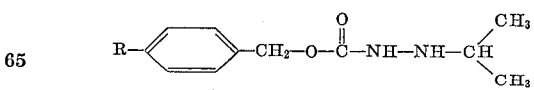

wherein R is selected from the group consisting of hydrogen, halogen and a lower alkoxy radical having 1 to 4 carbon atoms and the non-toxic, pharmacologically acceptable acid condition salts thereof. The said carbazates may be administered orally, transcutaneously or rectally.

The usual useful dosage of the benzyl-1-isopropyl carbazates of Formula I are between 5 and 20 mg. per individual dose and 10 and 50 mg. per day in adults depending upon the method of administration.

In the following examples there are described several preferred embodiments to illustrate the invention. However, it should be understood that the invention is not intended to be limited to the specific embodiments.

EXAMPLE I.—PREPARATION OF p-CHLOROBENZYL-1-ISOPROPYL-CARBAZATE

Step A.—Preparation of p-chlorobenzyl carbazate 180 cc. of hydrazine hydrate and 150 cc. of ethanol were agitated at a temperature between —5 and 0° C. and then 45 gm. of p-chlorobenzyl chloroformate and 90 cc. of ethanol were introduced and the agitation was continued for one hour at 0° C. The precipitate formed was separated by vacuum filtration and 500 cc. of N/5 hydrochloric acid were added. The mixture was filtered and washed with water. The filtrates were made alkaline by the addition of concentrated sodium hydroxide and the precipitate obtained thereby was vacuum filtered, washed with water and dried to obtain 36 gm. (corresponding to a yield of 63%) of p-chlorobenzyl carbazate which upon recrystallization from ethanol had a melting point of 130–131° C.

The product was obtained in the form of white crystals which were soluble in dilute acids, slightly soluble in ether and chloroform and insoluble in water and dilute alkalis.

Analysis.—$C_8H_9O_2N_2Cl$: molecular weight=200.6. Calculated: C, 47.89%; H, 4.52%; N, 13.96%; Cl, 17.67%. Found: C, 48.2%; H, 4.7%; N, 13.8%; Cl, 17.6%.

This compound is not described in the literature.

Step B.—Preparation of p-chlorobenzyl isopropylidene carbazate 35 gm. of p-chlorobenzyl carbazate were dissolved in 150 cc. of acetone by refluxing the mixture and then 5 drops of acetic acid were added and the mixture was refluxed for 3 hours. The reaction mixture was iced, and the product obtained thereby was vacuum filtered and dried in vacuo to obtain 31.5 gm. (yield 75%) of p-chlorobenzyl isopropylidene carbazate which upon recrystallization from ethanol had a melting point of 129–130° C.

The product was obtained in the form of white crystals which were soluble in chloroform, slightly soluble in dilute acids and ether and insoluble in water.

Analysis.—$C_{11}H_{13}O_2N_2Cl$: molecular weight=240.7. Calculated: C, 54.88%; H, 5.44%; N, 11.64%; Cl 14.73%. Found: C, 55.0%; H, 5.4%; N, 11.6%; Cl, 14.8%.

This compound is not described in the literature.

Step C.—Preparation of p-chlorobenzyl-1-isopropyl carbazate 4.2 gm. of potassium borohydride were intraduced, accompanied by agitation, into a mixture of 9 gm. of p-chlorobenzyl isopropylidene carbozate, 120 cc. of methanol and 30 cc. of water. The reaction mixture was stirred for 3 hours at 40° C., then cooled to room temperature, and 4.5 cc. of acetic acid were added. The methanol was distilled off in vacuo and the residue was poured into water. The precipitate formed was vacuum filtered, washed with water and dried in vacuo. The product was dissolved in 60 cc. of ethanol and then the solution was admixed while heating with a solution of 9 gm. of picric acid in methanol, and the mixture was iced for 2 hours. The product obtained was vacuum filtered, washed with iced methanol and dried in vacuo to obtain 8.6 gm. of the raw picrate of p-chlorobenzyl-1-isopropyl carbazate having a melting point of 168–170° C.

The product was obtained in the form of yellow crystals, soluble in acetone, slightly soluble in alcohol, ether and benzene, and insoluble in water.

This compound is not described in the literature.

The said picrate was suspended in 100 cc. of ether and 50 cc. of 10% lithium hydroxide. The suspension was stirred and decanted and the ether phase was washed with water, dried over sodium sulfate, washed with ether and evaporated to dryness in vacuo. The residue was dissolved in 10 cc. of cyclohexane under reflux, and was then allowed to crystallize to obtain p-chlorobenzyl-1-isopropyl carbazate having a melting point of 68–70° C.

The product was obtained in the form of white needles which were soluble in dilute acids, alcohol, ether, acetone, benzene, and chloroform, slightly soluble in olive oil, ethyl palmitate, aqueous acetylmethylamine and cyclohexane and insoluble in water, dilute alcohol and dilute alkalis.

Analysis.—$C_{11}H_{15}O_2N_2Cl$: molecular weight=242.7. Calculated: C, 54.43%; H, 6.23%; N, 11.54%; Cl, 14.61%. Found: C, 54.6%; H, 6.1%; N, 11.5%; Cl, 14.4%.

This compound is not described in the literature.

EXAMPLE II.—PREPARATION OF p-METHOXYBENZYL-1-ISOPROPYL CARBAZATE

Step A.—Preparation of p-methoxybenzyl-1-isopropylidene carbazate

A mixture of 27.7 gm. of p-methoxybenzyl carbazate, 55 cc. of acetone and 0.1 cc. of acetic acid were refluxed for one hour in a flask.

The reaction mixture was then iced for several hours, filtered, and the residue was vacuum filtered, stirred into a paste with a small amount of ether and dried in vacuo to obtain 25.2 gm. of p-methoxybenzyl-1-isopropylidene carbazate having a melting point of 120° C.

The said carbazate occurred in the form of a solid white product which was soluble in chloroform, acetone and hot benzene, slightly soluble in ether and insoluble in water and dilute aqueous acids.

Analysis.—$C_{12}H_{16}O_3N_2$: molecular weight=236.26. Calculated: C, 61.00%; H, 6.82%; N, 11.86%. Found: C, 61.2%, H, 6.8%; N, 11.8%.

This product is not described in the literature.

The starting product, p-methoxybenzyl carbazate, was obtained by the process described by L. A. Carpino, J.A.C.S., vol. 79, p. 98 (1957).

Step B.—Preparation of p-methoxybenzyl-1-isopropyl carbazate 10 gm. of p-methoxybenzyl isopropylidene carbazate, 250 cc. of methanol, 1 gm. of platinum oxide and 1 cc. of acetic acid were introduced into a flask. A stream of hydrogen was passed through the mixture for 2½ hours and the reaction mixture was then filtered. The methanolic solution was evaporated in vacuo, and a residue was obtained which was dissolved in 150 cc. of iso-octane. The solution was filtered while hot, iced for one hour and filtered again. The residue was vacuum filtered, stirred into a paste with a small amount of iso-octane and then petroleum ether, and was dried in vacuo to obtain 5.75 gm. of p-methoxybenzyl-1-isopropyl carbazate having a melting point of 70–72° C.

The product occurred as colorless needles which were soluble in dilute aqueous acids, alcohol, ether, acetone, benzene and chloroform and insoluble in water and dilute aqueous alkalis.

Analysis.—$C_{12}H_{18}O_3N_2$: molecular weight=238.28. Calculated: C, 60.48%; H, 7.61%; N, 11.76%. Found: C, 60.5%; H, 7.4%; N, 11.9%.

This product is not described in the literature.

EXAMPLE III.—PREPARATION OF p-FLUOROBENZYL-1-ISOPROPYL CARBAZATE

Step A.—Preparation of p-fluorobenzyl chloroformate 130 cc. of a 50% solution of phosgene in toluene were introduced into a flask. After the solution was cooled to −5° C. a solution of 19.4 gm. of quinoline and 18.9 gm. of p-fluorobenzyl alcohol was added and the mixture was agitated for four hours at 0° C. and was allowed to stand overnight at this temperature. The precipitate formed thereby was separated by filtration, and the filter cake was washed with benzene. The combined organic phases were distilled to dryness in vacuo at 40° C. to obtain p-fluorobenzyl chloroformate which was used as such in the second step.

This product is not described in the literature.

The starting product was obtained by the method described by F. T. Fang et al., J.A.C.S. 80, 563 (1958).

*Step B.—Preparation of p-fluorobenzyl carbazate*

50 cc. of hydrazine hydrate and 50 cc. of methanol were introduced into a flask. The mixture was cooled to −5° C. while stirring and the p-fluorobenzyl chloroformate obtained in Step A was added. The temperature was maintained between −5 and 0° C. for three hours and the agitation was continued. Thereafter, 100 cc. of water were added, the mixture was kept ice-cold for one hour and the precipitate formed was separated by vacuum filtration and washed with water. The residue was taken up twice in a solution formed by 4 cc. of concentrated hydrochloric acid in 150 cc. of water and the solution was filtered. The combined filtrates were decolorized with charcoal and the charcoal was filtered off and washed with water. The filtrate was made alkaline with sodium hydroxide and was vacuum filtered. The residue was washed with water and was dried in vacuo to obtain 10 gm. of p-fluorobenzyl carbazate having a melting point of 100–101° C. The said product was purified by dissolution in ethanol and addition of a solution of 1 N hydrochloric acid in ethanol. The resulting hydrochloride was vaccum filtered, washed with ethanol and was taken up in water and the solution was filtered. The filtrate was made alkaline with sodium hydroxide and the precipitate was vacuum filtered, washed with water and dried to obtain purified p-fluorobenzyl carbazate having a melting point of 103–104° C.

The product occurred in the form of white leaflets which were soluble in benzene and chloroform, very slightly soluble in ether and soluble in water.

*Analysis.*—$C_8H_9FN_2O_2$: molecular weight=184.17. Calculated: C, 52.16%; H, 4.92%; F, 10.31%; N, 15.21%. Found: C, 52.0%; H, 5.2%; F, 10.0%; N, 15.4%.

This product is not described in the literature.

*Step C.—Preparation of p-fluorobenzyl-1-isopropylidene carbazate*

8 gm. of p-fluorobenzyl carbazate, 35 cc. of acetone and 5 drops of acetic acid were introduced into a flask and the mixture was refluxed for one hour and was then concentrated to half its volume. At this point 20 cc. of water were added and the mixture was iced for one hour. The precipitate formed was separated, vacuum filtered, washed with water and dried to obtain 9.1 gm. of p-fluorobenzyl-1-isopropylidene carbazate having a melting point of 91–92° C. Upon purification by recrystallization from isopropyl ether, 7.5 gm. of p-fluorobenzyl-1-isopropylidene carbazate were recovered in the form of colorless needles having a melting point of 92–93° C., which were soluble in alcohol, benzene, acetone, and chloroform, slightly soluble in ether and insoluble in water.

*Analysis.*—$C_{11}H_{13}FN_2O_2$: molecular weight=224.23. Calculated: C, 58.92%; H, 5.84%; F, 8.47%; N, 12.49%. Found: C, 59.0%; H, 5.9%; F, 8.2%; N, 12.3%.

This product is not described in the literature.

*Step D.—Preparation of p-fluorobenzyl-1-isopropyl carbazate*

While stirring, 5 gm. of p-fluorobenzyl-1-isopropylidene carbazate, 20 cc. of methanol, 5 cc. of water and then 1 gm. of sodium borohydride were introduced into a flask, and the mixture was stirred for 2½ hours at 40° C. Thereafter, the mixture was cooled to 0° C. and 2 cc. of acetic acid were added. The methanol was distilled off and an additional 20 cc. of water were added. The water-soluble fraction was extracted with ether and the combined ether extract solutions were washed with water, dried over sodium sulfate and filtered. The ethereal solution was distilled to dryness and the residue was taken up in 10 cc. of hexane and ice. The crystalline residue was separated by filtration, vacuum filtered and dried in vacuo to obtain 3.8 gm. of raw p-fluorobenzyl-1-isopropyl-carbazate having a melting point of 53–55° C.

The raw product was taken up in 45 cc. of ether and 7 cc. of a 1 N ethanol solution of hydrochloric acid was added. The mixture was allowed to stand for one hour in the refrigerator and was filtered. The filter cake was vacuum filtered and washed with ether and was then taken up in 15 cc. of water. The solution was made alkaline with sodium hydroxide, iced for one hour, filtered and the residue was vacuum filtered and dried in vacuo to obtain 2.3 gm. of p-fluorobenzyl-1-isopropyl carbazate having a melting point of 63–64° C.

The product occurred in the form of colorless needles which were soluble in alcohol, ether, acetone, benzene, chloroform and dilute aqueous acids and insoluble in water.

*Analysis.*—$C_{11}H_{15}FN_2O_2$: molecular weight=226.24. Calculated: C, 58.40%; H, 6.68%; F, 8.39%; N, 12.38%. Found: C, 58.1%; H, 6.5%; F, 8.0%; N, 12.6%.

This product is not described in the literature.

EXAMPLE IV.—PREPARATION OF BENZYL-1-ISOPROPYL-CARBAZATE

*Step A.—Preparation of benzyl-1-isopropylidene-carbazate*

10 gm. of benzyl carbazate were dissolved in 10 cc. of acetone in a flask and then 2 drops of acetic acid were added and the mixture was refluxed for 45 minutes. The reaction mixture was iced for one hour and filtered and the residue was vacuum filtered, washed by trituration with a mixture of acetone and water (1:1) and dried in vacuo to obtain 5.6 gm. of benzyl-1-isopropylidene-carbazate having a melting point of 95° C. By diluting the mother liquors with water an additional 4.5 gm. of the product having a melting point of 90° C. were isolated. The raw product upon purification by recrystallization from a mixture of alcohol and water (1:1) had a melting point of 95° C.

The product occurred in the form of colorless needles, which were soluble in dilute aqueous acids, alcohol, acetone, benzene and chloroform, slightly soluble in ether and insoluble in water.

*Analysis.*—$C_{11}H_{14}O_2N_2$: molecular weight=206.24. Calculated: C, 64.06%; H, 6.84%; N, 13.58%. Found: C, 64.3%; H, 7.1%; N, 13.6%.

This product is not described in the literature.

The starting product, benzyl carbazate, was obtained by the process described by C. G. Overberger et al., J.A.C.S. vol. 77, page 4,100 (1955).

*Step B.—Preparation of benzyl-1-isopropyl-carbazate*

5 gm. of benzyl-1-isopropylidene-carbazate were dissolved in 4 parts by volume of methanol in a flask. After the solution was cooled to 0° C., a solution of 1.85 gm. of sodium borohydride in 1.85 cc. of 1 N sodium hydroxide and 3.70 cc. of water was slowly added and the mixture was stirred for 3 hours while maintaining the temperature at 0, +2° C., and then overnight at room temperature. The excess sodium borohydride was destroyed by slow oddition of acetic acid until a pH of 6 was reached. At this point about 70 cc. of water were added and the methanol was distilled off in vacuo. The residue was iced for one hour and filtered and the crystals were vacuum filtered, washed by trituration with water and dried in vacuo to obtain 2.7 gm. (78% yield) of benzyl-1-isopropyl-carbazate having a melting point of 56–57° C. which upon purification by recrystallization from petroleum ether had a melting point of 59–60° C.

The product occurred in the form of colorless needles which were very soluble in alcohol, ether, acetone, benzene and chloroform, soluble in dilute aqueous acids and insoluble in water and dilute aqueous alkalis.

Analysis.—$C_{11}H_{16}O_2N_2$; molecular weight=208.26. Calculated: C, 63.44%; H, 7.74%; N, 13.45%. Found: C, 63.4%; H, 7.9%; N, 13.7%.

This product is not described in the literature.

PHARMACOLOGICAL DATA (I) *Antidepressive activity.*—The antidepressive activity of the benzyl-1-isopropyl carbazates was evaluated by utilizing the property which is exhibited by all the mono-amino oxydase inhibitors, namely, to act as antagonists against the neuro-depressant effect of reserpine. This antagonistic effect is measured by the ptosis of the eyelids test according to Rubin (J. Pharmacol Exp. Therap. 1957, 120, 125).

The readings were taken 4 and 5 hours after intraperitoneal injection of 2 mg./kg. of reserpine into groups of mice as well as of rats which had received varying doses of the benzyl-1-isopropyl-carbazates 2 or 18 or 24 hours prior thereto.

The degree of ptosis of the eyelids observed in the control animals which received only 2 mg./kg. of reserpine was found to be approximately equal to 35 according to the utilized code (maximum 40). By virtue of the antagonism exercised by an active product, this figure drops with increasing doses and attains a value of 0 if the ptosis of the eyelids no longer appears after injection of the standard dose of reserpine. The ptosis of the eyelids test is used solely to permit a quantitative evaluation of the condition of the animal, but the antagonism equally effects all the neuro-depressive symptoms of reserpine such as immobility, adynamia, hypothermia, myosis, etc. Moreover, these symptoms do not appear if the dose of the drug is sufficient. On the contrary, a state of general excitation is produced. In the following tables the percentage of depressive activity represents the difference between the residual neuro-depressant effect of the treated and untreated groups expressed in percentages.

Tables II and III give the data obtained when the reserpine was administered to groups of 10 mice 2 hours after the benzyl-1-isopropyl carbozates were injected intraperitoneally.

TABLE II

| Compound Administered | Dosage, mg./kg. | Degree of Ptosis | | Percent Residual Depressive Activity |
|---|---|---|---|---|
| | | After 4 hr. | After 5 hr. | |
| Control | 0 | 40 | 38 | |
| p-Chlorobenzyl-1-isopropyl carbazate | 50 | 4 | 17 | 27 |
| | 100 | 0 | 3 | 4 |

TABLE III

| Compound Administered | Dosage in mg./kg. | Degree of Ptosis After— | |
|---|---|---|---|
| | | 4 hrs. | 5 hrs. |
| Control | 0 | 32 | 28 |
| p-Methyoxybenzyl-1-isopropyl carbazate | 20 | 22 | 17 |
| | 50 | 7 | 4 |
| | 100 | 0 | 0 |
| Control | 0 | 30 | 30 |
| p-Fluorobenzyl-1-isopropyl carbazate | 20 | 17 | 20 |
| | 50 | 10 | 11 |
| | 100 | 9 | 14 |
| Control | 0 | 30 | 31 |
| Benzyl-1-isopropyl-carbazate | 50 | 23 | 21 |
| | 100 | 23 | 22 |

Table IV gives the data obtained when the reserpine was administered to groups of 10 mice 24 hours after p-chlorobenzyl-1-isopropyl carbazate was injected intraperitoneally and Table V gives the data when the reserpine was administered to groups of 10 mice 18 hours after the said benzyl-1-isopropyl carbazates were injected intraperitoneally.

TABLE IV

| Compound Administered | Dosage in mg./kg. | Degree of Ptosis After— | | Percent Residual Depressive Activity |
|---|---|---|---|---|
| | | 4 hrs. | 5 hrs. | |
| Control | 0 | 36 | 38 | |
| p-Chlorobenzyl 1-isopropyl carbazate | 50 | 7 | 14 | 28 |
| | 100 | 2 | 1 | #0 |

TABLE V

| Compound Administered | Dosage in mg./kg. | Degree of Ptosis After— | |
|---|---|---|---|
| | | 4 hrs. | 5 hrs. |
| Control | 0 | 18 | 23 |
| p-Methoxybenzyl 1-isopropyl carbazate | 20 | 13 | 13 |
| | 50 | 0 | 4 |
| | 100 | 0 | 0 |
| Control | 0 | 31 | 31 |
| p-Fluorobenzyl 1-isopropyl carbazate | 20 | 28 | 28 |
| | 50 | 16 | 18 |
| | 100 | 10 | 11 |
| Control | 0 | 30 | 31 |
| Benzyl 1-isopropyl carbazate | 50 | 11 | 17 |
| | 100 | 3 | 2 |

Thus, at doses of 50 and 100 mg./kg., the drugs almost completely inhibit the neuro-depressive activity of reserpine.

The tests were repeated on groups of rats. Table VI gives the data obtained when the reserpine was administered 24 hours after p-chlorobenzyl 1-isopropyl carbazate or isopropyl isonicotinoyl hydrazine (iproniazide) was injected intraperitoneally and Table VII gives the data when the reserpine was administered 18 hours after the said benzyl 1-isopropyl carbazates were injected intraperitoneally.

TABLE VI

| Compound Administered | Dosage in mg./kg. | Degree of Ptosis After— | | Percent Residual Depressive Activity |
|---|---|---|---|---|
| | | 4 hrs. | 5 hrs. | |
| Control | 0 | 30 | 34 | |
| Iproniazide | 20 | 17 | 24 | 64 |
| | 50 | 1 | 0 | 2 |
| p-Chlorobenzyl 1-isopropyl carbazate | 5 | 33 | 38 | 100 |
| | 10 | 7 | 8 | 23 |
| | 20 | 1 | 3 | 6 |

TABLE VII

| Compound Administered | Dosage in mg./kg. | Percent Residual Depressive Activity |
|---|---|---|
| p-Methoxybenzyl 1-isopropyl carbazate | 10 | 44 |
| | 20 | 7 |
| | 50 | 2 |
| p-Fluorobenzyl 1-isopropyl carbazate | 5 | 65 |
| | 10 | 43 |
| | 20 | 22 |
| | 50 | 0 |
| Benzyl 1-isopropyl carbazate | 5 | 84 |
| | 10 | 56 |
| | 20 | 0 |

The same test was repeated on groups of rats with the reserpine being administered 24 hours after p-chlorobenzyl 1-isopropyl carbazate was administered per os. The results are in Table VIII.

TABLE VIII

| Compound Administered | Dosage in mg./kg. | Degree of Ptosis After— | | Percent Residual Depressive Activity |
|---|---|---|---|---|
| | | 4 hrs. | 5 hrs. | |
| Control | 0 | 37 | 36 | |
| p-Chlorobenzyl 1-isopropyl carbazate | 10 | 17 | 29 | 63 |
| | 20 | 11 | 20 | 42 |
| | 50 | 0 | 2 | 3 |
| | 100 | 0 | 0 | 0 |

These various tests clearly demonstrate the very distinct anti-depressive effect of the benzyl 1-isopropyl carbazates of the invention. Their median effective dose is approximately 10 mg./kg. while the median effective dose of iproniazide under the same conditions is about 35 mg./kg. Therefore, the compounds of the invention are 3 to 4 times more effective than the known psycholeptic, iproniazide.

(II) *Inhibiting effect of cerebral monoamino oxydase.*—
For this test, groups of 4 rats were treated with various doses of p-chlorobenzyl 1-isopropyl carbazate administered intraperitoneally while as many control groups received an equal volume of physiological serum. All the rats were sacrificed 18 hours after the injections and the oxidizing activity against catecholamines of homogenized preparations of brains was evaluated by utilizing serotonine as a substrate according to the modified technique of Udenfriend et al., J. Biol. Chem., vol. 215, p. 337 (1955).

According to this technique, the entire cerebral tissue was placed into a test tube containing 3 cc. of iced distilled water. After homogenization in the ice, 2 cc. of the suspension were withdrawn and 1 cc. of a serotonine solution containing 86.8 μgm. of serotonine per cc. was added thereto. The tube was hermetically closed and the tube was placed into an incubator for exactly 60 minutes. At the end of this period, 0.5 gm. of sodium carbonate, 4 gm. of sodium chloride, 1 cc. of sodium borate buffer and finally 20 cc. of butanol were added to the tube. The contents were vigorously agitated, and then the butanol phase was decanted and 15 cc. of it were removed. This volume was transferred to a tube containing 3 cc. of 0.2 N hydrochloric acid and 30 cc. of heptane. The mixture was agitated for 15 minutes, the suspension was centrifuged and the heptane phase was separated. 2 cc. of the hydrochloric acid phase were withdrawn and 0.5 cc. of nitroso β-naphthol and 0.5 cc. of a solution of 1 cc. of a 5% aqueous sodium nitrate solution and 25 cc. of 2 N sulfuric acid admixed just before use were added. The tube was carefully closed and placed on a water bath at 55° C. for 5 minutes. Thereafter, 10 cc. of dichloroethane were added and the mixture was agitated and then centrifuged. The violet surnatant aqueous phase was transferred to a photo-colorimeter dish and the optical density at 320 mμ was determined spectrophotometrically. The standardization of the optical densities curve was effected on the basis of a standard solution of serotonine containing 86.8 μgm./cc. treated in identical manner. Concurrent tests were conducted on groups of rats previously treated with iproniazide at a dose of 20 mg./kg. The results summarized in Table IX are the average of four tests.

TABLE IX

| Compound Administered | Dosage in mg./kg. | Residual Oxidant Activity of the Monoamines in percent of that of controls |
|---|---|---|
| p-Chlorobenzyl 1-isopropyl carbazate | 3 | 77.6 |
| | 4 | 61.0 |
| | 5 | 33.7 |
| Iproniazide | 10 | 24.8 |
| | 20 | 40.2 |
| | 20 | 59.2 |

The data in Table IX shows p-chlorobenzyl 1-isopropyl carbazate to be a powerful mono-amino oxydase inhibitor since its $ED_{50}$ (effective dose which reduces the activity of mono-amino oxydase by 50%) is about 4 mg./kg. and is about 5 times more active than iproniazide.

(III) *Toxicity determinations.*—A solution of p-chlorobenzyl 1-isopropyl carbazate in acidified water at a concentration of 10 mg./cc. was injected intraperitoneally at varying doses into groups of 5, 10 or 15 mice of the Rockland strain weighing between 18 and 22 gm. for each dose injected. The animals were placed under observation for 48 hours. The animals showed a brief period of convulsions or general stimulation followed by a depressive state. At high doses an immediate mortality was observed. The intoxicated animals subsequently recuperated almost completely. Nevertheless, in several cases a delayed mortality was observed whose mechanism was not determined. Table X indicates the observed mortality for each dose administered:

TABLE X

| Dosage in mg./kg. | Mortalities | | |
|---|---|---|---|
| | Immediate | Delayed | Total |
| 100 | 0/15 | 2/15 | 2/15 |
| 150 | 0/15 | 4/15 | 4/15 |
| 200 | 0/20 | 10/20 | 10/20 |
| 250 | 0/5 | 5/5 | 5/5 |
| 300 | 3/10 | 7/10 | 10/10 |
| 400 | 7/10 | 3/10 | 10/10 |

The median lethal dose ($LD_{50}$) of p-chlorobenzyl carbazate is therefore 200 mg./kg.

The other products, dissolved at a concentration of 10 mg./cc. in water acidulated with hydrochloric acid were administered intraperitoneally at doses ranging from 100 to 400 mg./kg. to groups of mice of the Rockland strain weighing between 18 and 22 km. The animals were observed for 48 hours as before and the $LD_{50}$ was determined.

For p-methoxybenzyl 1-isopropyl carbazate, 1 death out of 10 was observed at a dose of 400 mg./kg. and therefore its $LD_{50}$ is substantially greater than 400 mg./kg. For benzyl 1-isopropyl carbazate, no deaths out of 5 were noted at a dose of 200 mg./kg. and 5 deaths out of 5 at a dose of 300 mg./kg. and its $LD_{50}$ is approximately 250 mg./kg.

*Symptomatology.*—For p-methoxybenzyl 1-isopropyl carbazate, a state of general depression was noted. For benzyl 1-isopropyl carbazate, a lack of motor co-ordination with muscular hypertonicity was observed at a dose of 200 mk./kg. and at a dose of 300 mg./kg., lack of motor co-ordination followed by depression, then sleep, awakening 30 minutes later and again lack of motor co-ordination with muscular hypertonicity, then death a few hours later.

Various modifications of the process and compositions of the invention may be made without departing from the spirit or scope thereof and it is to be understood that

We claim:
1. Compounds having the formula

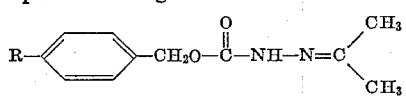

wherein R is selected from the group consisting of hydrogen, halogen and a lower alkoxy radical having 1 to 4 carbon atoms.
2. p-Chlorobenzyl isopropylidene-carbazate.
3. p-Fluorobenzyl isopropylidene-carbazate.
4. p-Methoxybenzyl isopropylidene-carbazate.
5. Benzyl isopropylidene-carbazate.

References Cited by the Examiner

UNITED STATES PATENTS

| | | | |
|---|---|---|---|
| 2,920,994 | 1/1960 | Epperly | 167—30 |
| 2,997,422 | 8/1961 | Tedeschi | 167—65 |
| 3,072,710 | 1/1963 | Flores | 260—482 |
| 3,086,987 | 4/1963 | Pomot | 260—482 |
| 3,088,871 | 5/1963 | Pfeiffer | 167—65 |

OTHER REFERENCES

Chem. abstracts vol. 51, page 5113f (1957).

LORRAINE A. WEINBERGER, *Primary Examiner.*

F. CACCIAPAGLIA, Jr., *Examiner.*

P. L. SABATINE, A. P. HALLUIN, *Assistant Examiners.*